US007130514B1

United States Patent
Chen et al.

(10) Patent No.: US 7,130,514 B1
(45) Date of Patent: Oct. 31, 2006

(54) HIGH SBS THRESHOLD OPTICAL FIBER

(75) Inventors: Xin Chen, Corning, NY (US);
Ming-Jun Li, Horseheads, NY (US);
Donnell Thaddeus Walton, Painted Post, NY (US); Luis Alberto Zenteno, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 9 days.

(21) Appl. No.: 11/154,855

(22) Filed: Jun. 15, 2005

(51) Int. Cl.
*G02B 6/02* (2006.01)

(52) U.S. Cl. ...................... 385/123; 385/127

(58) Field of Classification Search ......... 385/123–127
See application file for complete search history.

(56) References Cited

U.S. PATENT DOCUMENTS

| | | | |
|---|---|---|---|
| 6,542,683 B1 | 4/2003 | Evans et al. ................ | 385/127 |
| 6,587,623 B1 | 7/2003 | Papen et al. ................ | 385/123 |
| 6,687,440 B1 | 2/2004 | Balestra et al. ............. | 385/123 |
| 6,856,740 B1 | 2/2005 | Balestra et al. ............. | 385/123 |
| 7,006,752 B1 * | 2/2006 | Dragic ........................ | 385/142 |
| 2004/0009617 A1 | 1/2004 | Masuda et al. ............. | 438/5 |

OTHER PUBLICATIONS

Y. Koyamada, et al; "Simulating and Designing Brillouin Gain Spectrum in Single-Mode Fibers"; Journal of Lightwave Technology, vol. 22, No. 2, Feb. 2004; pp. 631-639.

"Single-Mode Fiber Optics: Principles and Applications", Second Edition, Revised and Expanded; Luc B. Jeunhomme, Photonetics; Marly le Roi, France; Marcel Dekker, Inc.; pp. 39-44; New York 1990.

* cited by examiner

*Primary Examiner*—Sung Pak
*Assistant Examiner*—Tina M. Wong
(74) *Attorney, Agent, or Firm*—Svetlana Z. Short

(57) ABSTRACT

An optical waveguide fiber having a high threshold for stimulated Brillouin scattering. According to some embodiments of the invention, the optical fiber comprises: (a) a rare earth doped core having a refractive index profile and a centerline, the core including at least two adjacent core regions including different amounts of updopants, such that the longitudinal acoustic field velocities within the two core regions differ by at least 0.2%; and (b) a cladding layer surrounding and directly adjacent the core. The said fiber has MFD of greater than 12 μm and delta % difference between the peak core delta and the cladding of less than 0.3%.

15 Claims, 11 Drawing Sheets

B/F codoped silica outer-clad process made the high NA, all-glass double-clad fiber structure possible −1.5% delta by B/F co-doping

HIGH SBS THRESHOLD OPTICAL FIBER

Parts of this invention were made with Government support under Agreement No. MDA972-02-3-004 awarded by DARPA. The Government may have certain rights in some of the claims of the invention.

BACKGROUND OF THE INVENTION

1. Field of the Invention

The present invention relates to high SBS threshold optical fibers.

2. Technical Background

Stimulated Brillouin Scattering (SBS) is a dominant nonlinear penalty in many optical transmission systems. In many systems, it is desirable to transmit large optical power in optical fibers, while maintaining high signal to noise ratio (SNR). However, as the launch power or signal power of an incident signal launched into an optical fiber increases, the launch power may exceed a certain threshold power and part of the signal power gets reflected due to SBS as a backward propagating signal. An undesirably large amount of the signal power can thus be reflected back toward the transmitter due to SBS. In addition, the scattering process increases the noise level at the signal wavelength. The combination of decrease in signal power and increase in the noise both lower the SNR and lead to performance degradation.

At finite temperatures, thermal excitations occur in glasses similar to phonons in crystals, and the interaction of these vibrational modes with low intensity signal light produces spontaneous Brillouin scattering. An intense optical field generates pressure or sound waves through electrostriction due to the beating of intense incident and spontaneous reflected light, giving rise to pressure or acoustic fields. The change in pressure causes material density to change, thereby resulting in refractive index fluctuations. The net result is that an intense electrical field component of the optical field generates pressure or sound (acoustic) fields which cause material density fluctuations. The acoustic field changes the refractive index and enhances the reflected light amplitude through Bragg diffraction. Above the SBS threshold of an optical fiber, the number of stimulated photons is very high, resulting in a strong reflected field which limits the optical power that is transmitted and which reduces the SNR.

U.S. Pat. No. 6,856,740 and U.S. Pat. No. 6,687,440 disclose the use of acoustic field anti-guiding to reduce SBS. This is achieved by an optical fiber core that is doped such that the longitudinal acoustic velocity of the fiber core is higher than that of the cladding. (That is, "the effective index of refraction" for the acoustic field is lower than that of the cladding.) However, our analysis showed that this technique will have limited utility because acoustic cladding modes become prevalent in the absence of core modes. The acoustic cladding modes then couple into the core, creating SBS and establishing the SBS threshold. Furthermore, one technique for achieving acoustic field anti-guiding within the fiber core utilizes special coatings. The low damage threshold of such coatings precludes the use of such fiber in extremely high optical power applications.

US patent application No 2004/009617 and U.S. Pat. No. 6,587,623 also disclose a similar SBS reduction technique. These references are directed to SBS reduction via reduction of the acoustic core modes, by allowing acoustic modes to propagate in the fiber cladding. Again, this approach fails to consider acoustic cladding modes which couple into the fiber core and then become confined inside the core, where they overlap with optical modes and play a major role in the SBS threshold. Furthermore, these references focus on shear velocity when longitudinal acoustic velocity is known to be the dominant parameter in SBS.

U.S. Pat. No. 6,542,683 discloses that the SBS effect is mitigated by an optical fiber with a core with both radially nonuniform viscosity and non-uniform CTE provided by alternating different layers of glass, via modifying dopants such as phosphorous and fluorine. The patent teaches that the thickness of the alternating layers should be less than 0.5 µm.

The paper by Y. Koyamada et al. (J. of Lightwave Technology, vol. 22, pp. 631–639, 2004) discloses a method of suppressing acoustic modes propagating in the fiber core by making the longitudinal acoustic velocity in the core higher than in the cladding. This is achieved by doping the fiber cladding with Fluorine, thereby decreasing the cladding's refractive index while lowering acoustic velocity within the cladding. The amount of Ge in the core was decreased to provide the appropriate delta, relative to the cladding. The paper teaches for the fiber with a 1 µm radius (Ge doped) core with the very high refractive index delta (3.7% optical delta relative to the cladding) and Fluorine doped cladding, minimum SBS (high SBS threshold) occurs when the longitudinal acoustic velocity difference between the core and cladding is 0.03.

SUMMARY OF THE INVENTION

Disclosed herein is an optical waveguide fiber having a high threshold for stimulated Brillouin scattering. According to some embodiments of the invention, the optical fiber comprises: (a) a rare earth doped core having a refractive index profile and a centerline, the core including at least two adjacent core regions including different amounts of updopants, such that the longitudinal acoustic field velocities within the two core regions differ by at least 0.2%; and (b) a cladding layer surrounding and directly adjacent the core. The said fiber has MFD of greater than 12 µm and delta % difference between the peak core delta and the cladding of less than 0.3%. According to some embodiments of the present invention the longitudinal acoustic field velocities within the two core regions differ by at least 0.2%.

According to some embodiments of the present invention the optical delta profile of said core has a depressed region directly surrounding the centerline and said the depressed region has a radius that is wider than 0.5 µm, more preferably at least 0.7 µm and even more preferably at least 1 µm, and most preferably 2 or more µm. According to some embodiments the fiber has an MFD of 25 µm to 50 µm.

According to some embodiments of the present invention the delta % difference between the peak core delta and the cladding is less than 0.2%, preferably less than 0.12%. The cladding may be either F doped silica or pure silica.

According to some embodiments, the optical fiber comprises:

a Ge doped core having a refractive index profile and a centerline, the core comprising a first region having an acoustic delta $\Delta_1$ and a second region directly adjacent the first region and having a acoustic delta $\Delta_2$ wherein $\Delta_1$ does not equal to $\Delta_2$, wherein the refractive index of the core is selected to provide an overlap integral less than 0.8. It is preferable that the overlap integral is less than 0.65. It is even more preferable that the overlap integral is less than 0.5. According to some embodiments of the present invention the first region has an outer radius of no more than 3–4

μm and the second region has an outer radius of more than 4 μm. It is preferable that the first region has an outer radius of no more than ⅓ of the fiber core radius and the second region has an outer radius greater than ⅓ more of the fiber core radius.

Reference will now be made in detail to the present preferred embodiments of the invention, examples of which are illustrated in the accompanying drawings.

BRIEF DESCRIPTION OF THE DRAWINGS

FIG. 2b illustrates the longitudinal acoustic delta profile of the standard single mode optical of FIG. 2a;

FIG. 3b illustrates a cross-sectional view of the optical fiber corresponding to FIG. 3a;

FIG. 3c illustrates the actual index profile of a optical fiber of FIG. 3b;

FIG. 4b illustrates the longitudinal acoustic delta profile of the of the optical fiber according to the present invention that has the refractive index profile shown in FIG. 4a;

FIG. 6b illustrates the longitudinal acoustic delta profile of the optical fiber corresponding to FIG. 6a;

FIG. 7b illustrates the longitudinal acoustic delta profile of the optical fiber corresponding to FIG. 7a;

FIG. 8b is a plot of optical and longitudinal acoustic fields of the optical fiber that corresponds to the optical delta profile of FIG. 8a.

DETAILED DESCRIPTION OF THE EMBODIMENTS

Figure 1:
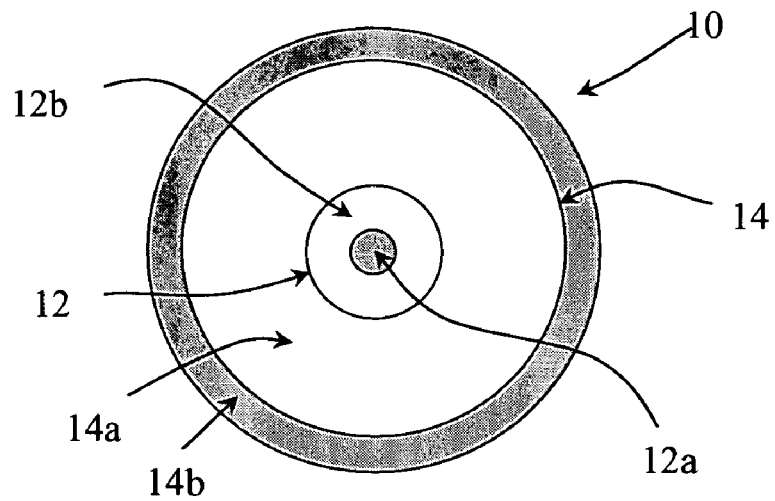
FIG. 1 is a schematic cross-sectional view of one embodiment of the optical fiber according to the present invention.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" or optical delta is defined as delta percent ($\Delta\%$), where $\Delta\% = 100 \times (n_i^2 - n_c^2)/2n_i^2$, where $n_i$ is the maximum refractive index in region i, unless otherwise specified, and $n_c$ is the average refractive index of the cladding region. As used herein, the relative refractive index is represented by $\Delta$ and its values are given in units of "%", unless otherwise specified. In cases where the refractive index of a region is less than the average refractive index of the cladding region, the relative index percent is negative and is referred to as having a depressed region or depressed index, and is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Zero dispersion wavelength is a wavelength at which the dispersion has a value of zero. Dispersion slope is the rate of change of dispersion with respect to wavelength.

"Effective area" is defined as:

$$A_{\mathit{eff}} = 2\pi (\int f^2(r) r \, dr)^2 / (\int f^4(r) r \, dr)$$

where the integration limits are 0 to $\infty$, and f is the transverse component of the electric field associated with light propagated in the waveguide. As used herein, "effective area" or "$A_{\mathit{eff}}$" refers to optical effective area at a wavelength of 1550 nm unless otherwise noted.

The term "α-profile" refers to a relative refractive index profile, expressed in terms of $\Delta(r)$ which is in units of "%", where r is radius, which follows the equation, $$\Delta(r) = \Delta(r_0)(1 - [|r - r_0|/(r_1 - r_0)]^\alpha),$$

where $r_0$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The mode field diameter (MFD) is measured using the Peterman II method wherein, 2w=MFD, and $w^2=(2\int f^2(r) r dr/\int [df(r)/dr]^2 r dr)$, the integral limits being 0 to ∞.

The bend resistance of a waveguide fiber can be gauged by induced attenuation under prescribed test conditions.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39–44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Kappa is the ratio of dispersion divided by dispersion slope at a particular wavelength. Unless otherwise noted herein, kappa is reported at a wavelength of 1550 nm.

Unless otherwise noted herein, optical properties (such as dispersion, dispersion slope, etc.) are reported for the LP01 mode.

A waveguide fiber telecommunications link, or simply a link, is made up of a transmitter of light signals, a receiver of light signals, and a length of waveguide fiber or fibers having respective ends optically coupled to the transmitter and receiver to propagate light signals there between. The length of waveguide fiber can be made up of a plurality of shorter lengths that are spliced or connected together in end to end series arrangement. A link can include additional optical components such as optical amplifiers, optical attenuators, optical isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

When an optical field propagates in an optical waveguide in which acoustic modes are present, the optical field is scattered by the acoustic field. The electric field that describes the SBS satisfies the nonlinear wave equation:

$$\nabla^2 \tilde{E} = \mu_0 \varepsilon_0 \varepsilon \frac{\partial^2 \tilde{E}}{\partial t^2} + \mu_0 \frac{\partial^2 \tilde{P}_{NL}}{\partial t^2} \quad (1)$$

$$\tilde{P}_{NL} = \frac{\gamma}{\rho_0} \tilde{\rho} \tilde{E} \quad (2)$$

where $\epsilon = \epsilon_r - i\epsilon_i$ is complex dielectric constant, $P_{NL}$ is the nonlinear polarization due to the interaction between the electrical field and acoustic field, $\rho_0$ is the material density, $\tilde{\rho}$ is the density fluctuation caused by the acoustic field, which satisfies the nonlinear acoustic wave equation:

$$\frac{\partial^2 \tilde{\rho}}{\partial t^2} = \left(V_L^2 + \Gamma \frac{\partial}{\partial t}\right)\nabla^2 \tilde{\rho} - \frac{\gamma}{2}\nabla^2 \tilde{E}^2 \quad (3)$$

where γ is electrostrictive coefficient, Γ is the damping factor, and $V_L$ is the longitudinal acoustic velocity. The electric field can be written in the following form:

$$\tilde{E} = A_p(z)E_p(r,\theta)e^{i(\omega_p t - \beta_p z)} + A_p(z)E_s(r,\theta)e^{i(\omega_s t + \beta_s z)} + c.c. \quad (4)$$

where $E_j$(j=p,s) is the transverse electric filed distribution that satisfies the mode equation $$\nabla_t^2 E_j + (\mu_0 \epsilon_0 \epsilon \omega_j^2 - \beta_j^2)E_j = 0$$

$\omega_j$(j=p,s) is the optical frequency, $\beta_j$(j=p,s) is the optical propagation constant, p denotes the power of the optical signal propagating through the fiber core, and s denotes the Brillouin scattering signal. Without the electric field, the acoustic field equation has a set of modal solutions $\rho_\mu$. With the electric field in Eq. (4), we assume a solution of the following form $$\tilde{\rho} = \sum_u A_u(z)\rho_u(r,\theta)e^{i(\Omega_u t - B_u z)} + c.c. \quad (6)$$

where Ω is the acoustic frequency and the B is the propagation constant of the acoustic mode. Neglecting the damping factor, the mode $\rho_\mu$ satisfies $$\nabla_t^2 \rho_u + \left(\frac{\Omega_u^2}{V_L^2} - B_u^2\right)\rho_u = 0 \quad (7)$$

From the above equations we can derive the equations for the optical power changes for the pump and the signal:

$$\frac{dP_p}{dz} = -\alpha_0 P_p - \sum \frac{1}{2}[g_u(e^{i\Delta\beta_u z - \alpha_u z} - 1) + g_u^*(e^{-i\Delta\beta_u z - \alpha_u z} - 1)]P_p P_s \quad (8)$$

$$\frac{dP_s}{dz} = -\alpha_0 P_s - \sum \frac{1}{2}[g_u(e^{i\Delta\beta_u z - \alpha_u z} - 1) + g_u^*(e^{-i\Delta\beta_u z - \alpha_u z} - 1)]P_p P_s \quad (9)$$

where $g_u$ is the SBS gain coefficient due to acoustic mode number u $$g_u = \frac{g_0 \bar{I}_u^{ao}}{(\alpha_u - i\Delta\beta_u)KA_{eff}} \quad (10)$$

where $g_0$ is a parameter determined by the material, $\alpha u$ is the loss of the acoustic mode, $\Delta\beta_u$ is the phase mismatch between the acoustic and optical modes, $A_{eff}$ is optical effective area, $$A_{eff} = \frac{\left(\int E_0 E_0^* r\,dr\,d\theta\right)^2}{\int (E_0 E_0^*)^2 r\,dr\,d\theta} \quad (11)$$

and $\bar{I}_u^{ao}$ is the normalized overlap integral between the electric and acoustic fields $$\bar{I}_u^{ao} = \frac{\left(\int E_0 E_0^* \rho_u^* r\,dr\,d\theta\right)^2}{\int (E_0 E_0^*)^2 r\,dr\,d\theta \int \rho\rho^* r\,dr\,d\theta} \quad (12)$$

Equation (10) shows that the SBS gain coefficient depends on two parameters that are related to fiber design: one is the optical effective area $A_{eff}$, the other is the overlap integral $\bar{I}_u^{ao}$. To reduce the SBS effect, one can increase the optical effective area (thus reducing optical power density), and/or decrease the overlap integral.

To capture the effects from both the optical effective area and the overlap integral, we define a figure of merit (FOM) by taking the ratio of optical effective area over the overlap integral:

$$F = \frac{A_{eff}}{\bar{I}_u^{ao}} \quad (13)$$

The figure of merit can be used to gauge the SBS improvement from one optical fiber (reference fiber) to another optical fiber.

The SBS power grows exponentially with fiber length. For uniform Brillouin frequency shift along the fiber, the peak SBS power threshold is inversely proportional to the gain coefficient and fiber effective length:

$$P \propto \frac{1}{g_u L_{eff}} = \frac{K\alpha_u A_{eff}}{g_0 \bar{I}_u^{ao} L_{eff}} = \frac{K\alpha_u F}{g_0 L_{eff}} \quad (14)$$

where $L_{eff}$ is the effective length of fiber defined by $$L_{eff} = \frac{1 - e^{-\alpha_o L}}{\alpha_o},$$

where $\alpha_0$ is the optical attenuation coefficient and L is the fiber length.

In order to improve the SBS performance of an optical fiber, the figure of merit FOM should be designed to take a larger value than a conventional fiber without the optimized performance in SBS. The ratio of the F of the fiber being designed to that of a reference fiber is the factor that the SBS threshold is improved. It is also converted into dB unit as described in this invention disclosure.

It can be seen from Equations (5) and (7) that the optical field and longitudinal acoustic field are governed by similar type of scalar wave equations. The two equations can be written in the same form for the fundamental optical mode and the acoustic mode with no azimuthal variation that are involved in the SBS $$\frac{d^2 f_o}{dr^2} + \frac{1}{r}\frac{df_o}{dr} + k_o^2(n_o^2(r) - n_{oeff}^2)f_o = 0 \quad (15a)$$

$$\frac{d^2 f_a}{dr^2} + \frac{1}{r}\frac{df_a}{dr} + k_a^2(n_a^2(r) - n_{aeff}^2)f_a = 0 \quad (15b)$$

where the subscript o stands for the optical field and subscript a stands for the acoustic field. For an optical mode, $f_o$ is the optical field distribution, $n_o(r)$ describes the refractive index as a function of the radial position, and $k_o$ is the optical wave number, which is linked to the optical wavelength by $2\pi/\lambda$.

For an acoustic field, $f_a$ is the acoustic field distribution and the acoustic refractive index is defined as $$n_a(r) = \frac{V_{clad}}{V_L(r)}, \quad (16)$$

and $$k_a = \frac{2\pi}{\lambda/(2n_{oeff})} = \frac{2\pi}{\lambda'} \quad (17)$$

where $\lambda'$ is the acoustic wavelength.

In practice, the (optical) refractive index profile is often described by the optical delta profile or optical refractive index delta profile. We can also similarly define the delta for the acoustic refractive index so that each optical refractive index profile is also associated with a corresponding acoustic delta profile that describes the acoustic behavior of longitudinal field. Using the index definitions for the optical and acoustic fields, we can describe the optical and acoustic delta profiles using the following equation:

$$\Delta_o = \frac{n_o^2(r) - n_{oc}^2}{2n_o^2(r)} \times 100\%, \quad (18)$$

$$\Delta_a = \frac{n_a^2(r) - n_{ac}^2}{2n_a^2(r)} \times 100\%$$

where subscript "o" stands for optical field and a stands for acoustic field, and "c" denotes the index for the cladding.

The optical refractive index of the core as the function of the Ge doping concentration is described by the following equation, $$n(w_{GeO2}, w_F) = n_o(1 + 1.0 \times 10^{-3} * w_{Ge}) \quad (19),$$

where $w_{GeO2}$ is the mole percent of the Ge dopant, The Ge doping contributes to the increase the refractive index from that of pure silica. The role of the Ge doping on the longitudinal acoustic velocity takes the following form, $$V_L(w_{GeO2}, w_F) = 5944 \times (1 - 7.2 \times 10^{-3} * w_{GeO2}) \qquad (20),$$

where the longitudinal acoustic velocity is in the unit of m/s.

An optical waveguide fiber which is optically single-moded at a particular wavelength (assuming $\lambda = 1.55$ μm) may be multi-moded acoustically because the acoustic wavelength corresponding to Brillouin frequency is of the order of 0.55 μm, which is quite small compared to typical optical waveguide fiber dimensions. (See Eqs. (16) and (17).) In the case of spontaneous Brillouin scattering at relatively low launch powers, the incident optical field is Brillouin scattered by each of the acoustic modes and Brillouin gain spectrum shows peaks corresponding to optical field interaction with each of the acoustic modes. At relatively high launch powers, the SBS threshold is exceeded, and one of the acoustic modes typically becomes dominant while the other acoustic modes do not survive the mode competition, leading to the onset of stimulated Brillouin scattering.

As coupling between the optical mode field and the acoustic mode field(s) increases, more optical power is undesirably reflected opposite to the direction of optical signal transmission.

As disclosed herein, the coupling between the optical and acoustic modes is preferably reduced via optical and acoustic index profiles of the optical fiber disclosed herein. In some embodiments, optical mode field remains extended to the whole core region while acoustic fields become more tightly confined to one region of the core to reduce overlap between the optical mode field and the acoustic fields.

Thus, in some of the embodiments of the present invention, the optical fiber 10 disclosed herein (see FIG. 1a) tends to pull the mode field of the dominant acoustic mode field (for example, $L_{01}$) either (a) in toward the centerline of the optical fiber, or (b) outward towards the edge of the core 12, resulting in reduced coupling between the acoustic and optical fields. Preferably, the optical fiber 10 also tends to pull the mode field of the next dominant acoustic mode field (typically $L_{02}$) either (a) in toward the centerline of the optical fiber, or (b) outward towards the edge of the core, resulting in reduced coupling between this next dominant acoustic mode field and the optical field.

The Brillouin frequency shift for optical fiber as disclosed herein is preferably between about 9.5 to 12 GHz, for the 1550 nm wavelengths (and is higher when measured at shorter wavelengths).

We have found that a higher dopant concentration of the materials that reduce acoustic field velocity (for example Ge). Putting more Ge near the edge of the core (region 12b) reduces acoustic field velocity in that region and shifts acoustic modes toward the edge of the core 12. This higher concentration of the updopant toward the edge of the core (region 12b) creates a higher refractive index delta % at the edge of the core 12 and a lower refractive index delta % in the core region adjacent to centerline (12a). However, the optical refractive index difference between the two core regions is small enough so that optical mode remains extended to the whole core region. In this way, the overlap between the optical mode and the dominant acoustic mode is reduced resulting in decrease in SBS.

The core 12 of the optical fiber 10 may comprise a first portion (core region 12a) extending from the centerline to a radius of 0.7 μm to about 3 μm. Preferably the radius of the core region 12a is at least 1 μm. Alternatively the core 12 may comprise a first portion (core region 12a) extending from the centerline to a distance of about 0.1r to 0.5r, where r is the core radius. In some of the embodiments the depression in the core's refractive index profile corresponds to the core region 12a.

It is preferred, for optical laser fiber, that peak or maximum refractive index delta $\Delta_{MAX}$ is about $0.05\% < \Delta_{MAX} < 0.3\%$, the optical effective area at 1550 nm between larger than 140 μm², preferably larger than 150 μm², more preferably between 159 and 2000 μm².

As described above, SBS originates from the interaction between optical field and acoustic field. In a single optical fiber, the gain of SBS depends on the SBS spectrum and the overlap between the optical mode and acoustic modes. Thus, one way to reduce the overlap between the optical mode and acoustic modes by fiber profile designs, is to make a small change of the optical refractive index profile (delta % profile) so that the optical properties are not changed dramatically, while corresponding change to the acoustic delta % profile of the optical fiber 10 is sufficiently large enough to make the acoustic mode field alter substantially.

In order to form an acoustic waveguide within the fiber core, the longitudinal and shear acoustic velocities are lower in the fiber core than in the cladding. This is normally the case for optical fibers with a typical Ge updoped core (and with no co-dopants).

The longitudinal and shear acoustic velocity increase with the increase of Ge doping level in the silica glass. Because the interaction between the acoustic field and optical field is dominated by the longitudinal acoustic field, in the following paragraphs, we discuss the longitudinal acoustic field only.

Figure 2A:
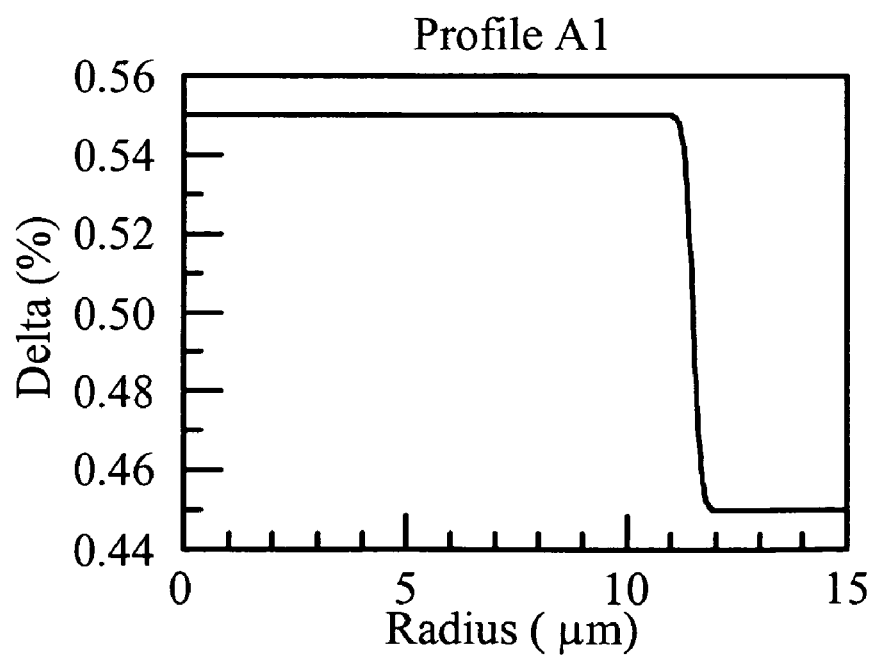
FIG. 2a illustrates the refractive index profile of a standard laser fiber.

A typical laser fiber has the optical delta profile which is a step function, as shown in FIG. 2a. The core of the fiber shown in FIG. 2a is doped with about 5.34 mol % Ge, which results in an optical delta % of 0.55%, relative to pure silica glass. The cladding is doped with about 4.37 mol % Ge, which results in an optical delta % of 0.45%, relative to pure silica glass. Thus the delta % difference between the core and the cladding is about 0.1%. This positive optical delta % difference corresponds to the optical core through which the signal propagates. This typical laser fiber has a MFD of 21.6 μm, effective area of 385.3 μm². The FOM of the fundamental acoustic field L01 is 385.4 μm². The core delta is due only to Ge. The core includes no other dopants. In our modeling, we have ignored the refractive index contribution of the rare earth doping materials. These materials are usually uniformly doped across the fiber core, therefore when they are added the optical properties and SBS properties are not dramatically changed. In addition, the amount of Ge is easily adjusted to maintain the optical delta difference, and/ to achieve optimal performance.

Figure 2B:
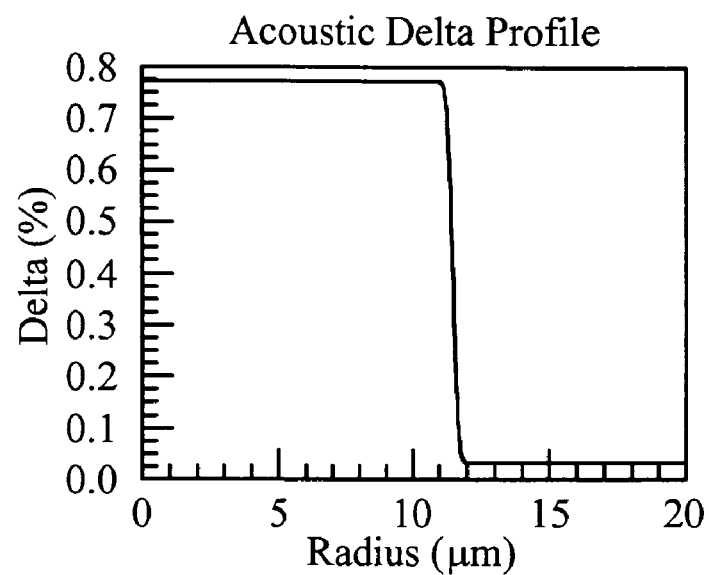
Figure 2C:
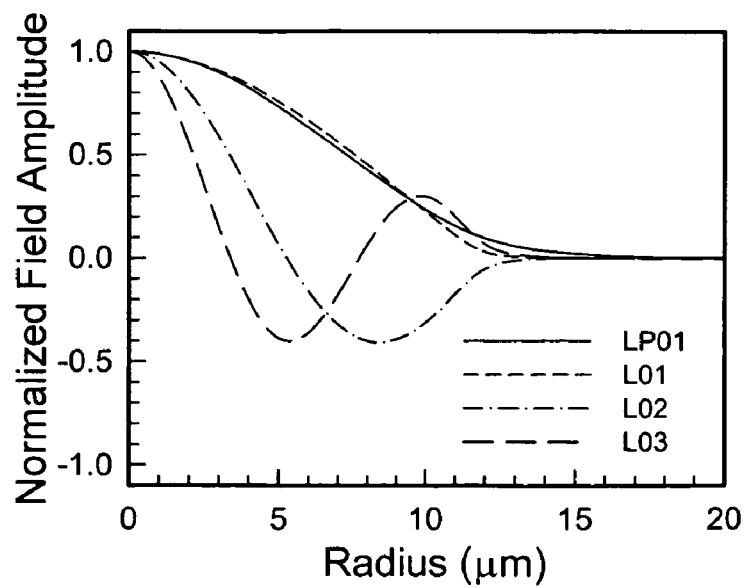
FIG. 2c illustrates a plot of optical and longitudinal acoustic fields of the optical fiber that corresponds to the optical delta profile of FIG. 2a and the acoustic delta profile of FIG. 2b.

For acoustic fields, the longitudinal acoustic delta profile for this laser fiber is shown FIG. 2b. FIG. 2c illustrate that the longitudinal acoustic fields are guided inside the region of the same size as the optical waveguiding core (i.e., within the radius of 12 μm), which results in a large overlap between the fundamental optical mode and lower order acoustic modes (and an overlap integral of about 1.0). Thus, this type of fiber has a relatively large amount of SBS.

In order to reduce SBS, the optical fiber 10, according to some embodiments of the present invention utilizes, in at least one area or region of a silica-based core 12, has a higher amount of updopant (for example, Ge), then the adjacent core region. No other co-dopants are required.

Since Ge increases the optical refractive index, while decreasing the acoustic velocity, by utilizing different amounts of Ge within the core 12, we can design optical fibers 10 with a depression (dip) in the optical delta % profile which has a corresponding depression in the acoustic delta % profile. It is preferable that the width of the depressed region is at least 1 μm.

Of course, other type of optical fibers may also be designed by utilizing the same approach to provide the same optical delta profile, while having a different acoustic delta profile and, therefore, improved SBS. These optical fibers include dispersion compensation fibers, other types of laser fibers, and non-linear optical fibers. It is noted that co-dopants such as F, may also be utilized to create a depression or dip in the optical refractive index delta within the core 12.

Figure 3A:
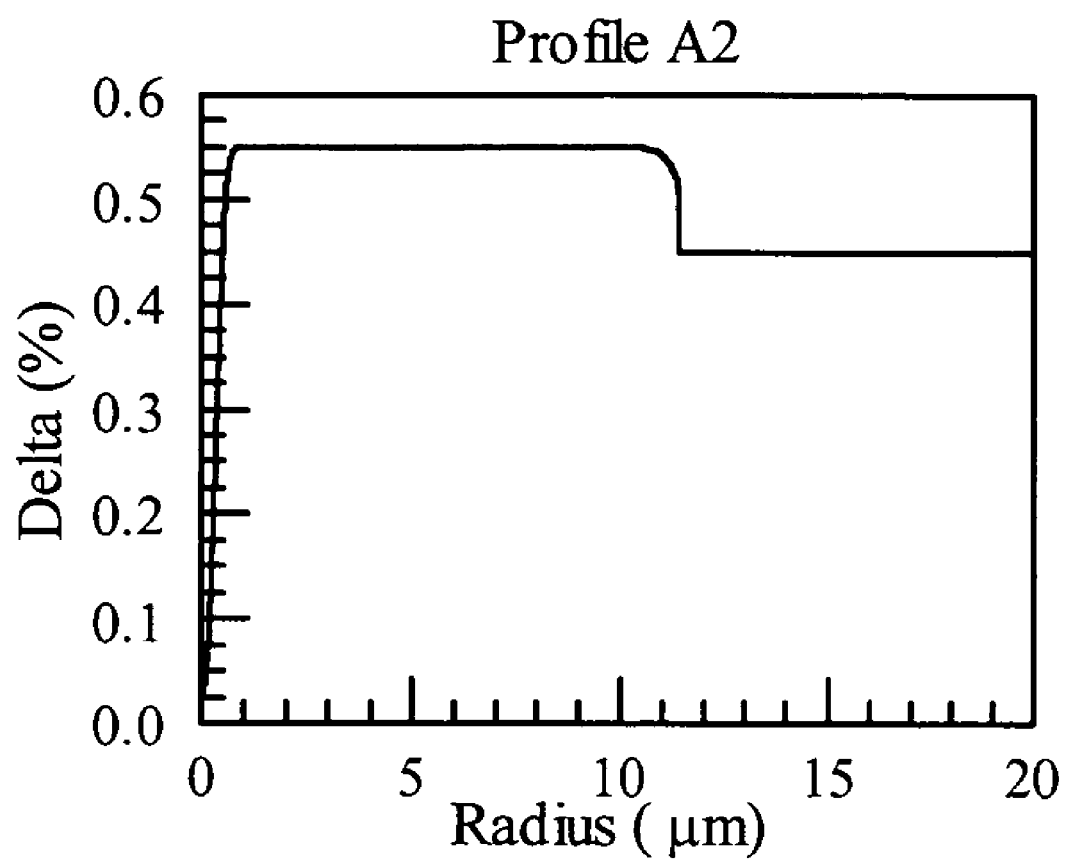
FIG. 3a illustrates schematically the refractive index profile of a laser fiber with a narrow centerline dip.
Figures 3B, 3C:
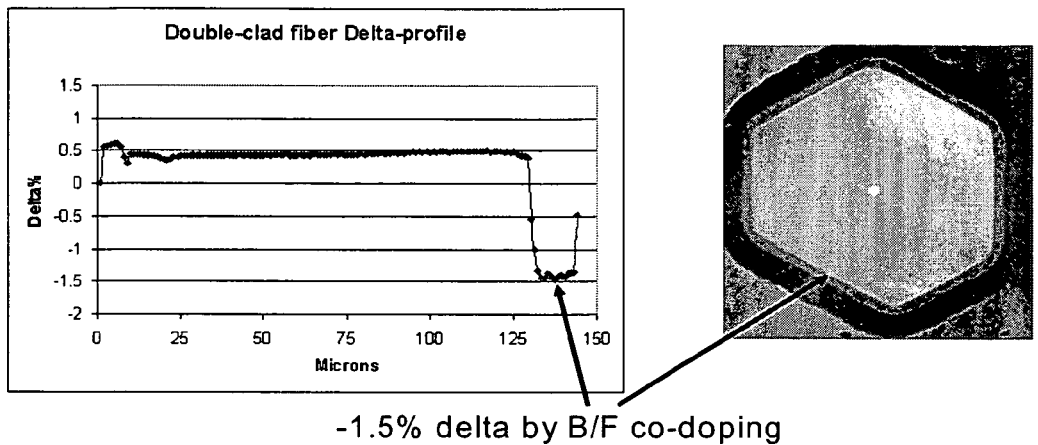

FIG. 3a illustrates an optical delta profile that has a dip in the core region adjacent to the center line (region 12a). The optical properties for the exemplary fiber 10 are similar to the optical properties of the fiber from FIG. 2a. However, in the optical fiber of this example the center line dip is wider than a typical center line dip width attributable to the usual fiber making process, resulting in better SBS. FIG. 3b illustrates a cross-sectional view of a laser fiber according to one embodiment of the present invention. The optical fiber 10 of FIG. 3a includes a core 12 with a region 12a that has a relatively low amount of Ge and a region 12b that includes a relatively high amount of Ge. The core includes Ge and or Yb to facilitate lasing or gain. Other active, rare-earth dopants, such as Er, Tm or Nd may also be utilized.

The core 12 is surrounded by the silica based cladding 14 that includes an inner cladding 14a and an outer cladding 14b. The inner cladding region 14a allows for efficient coupling of optical pump power into the optical fiber 10 of this example, such that the pump light propagates through the inner cladding 14a, prior to coupling into the core 12.

EXAMPLE 1

Confining the Longitudinal Acoustic Field

Figure 4A:
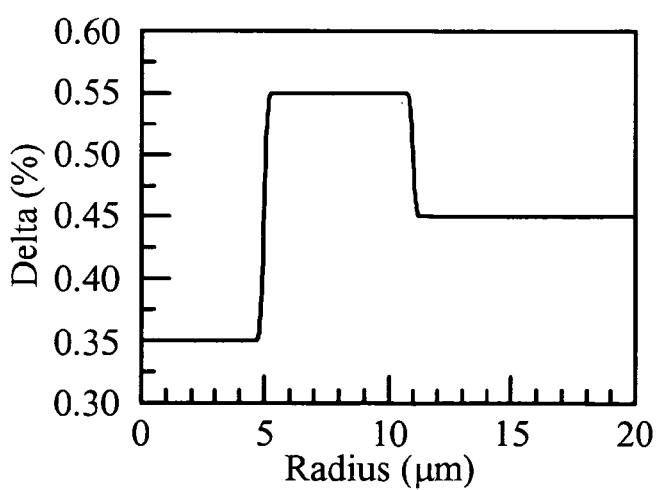
FIG. 4a illustrates the refractive index profile of a reduced SBS laser fiber according to an embodiment of the present invention.
Figure 4B:
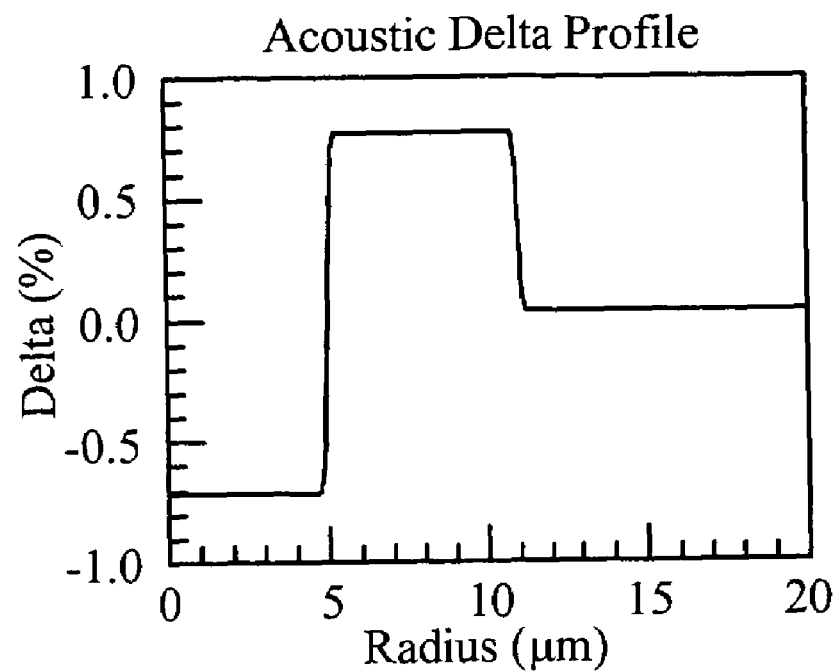
Figure 4C:
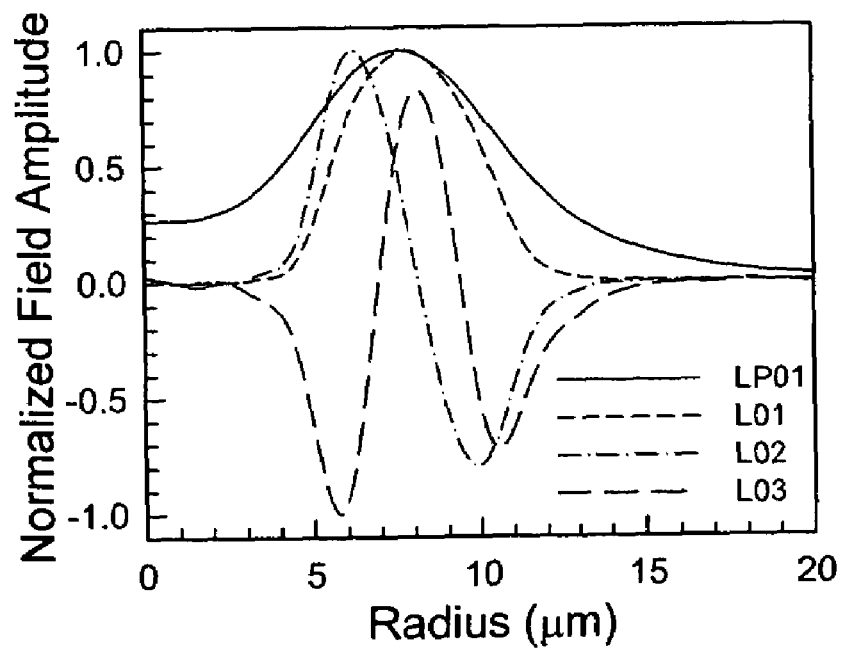
FIG. 4c illustrates a plot of optical and longitudinal acoustic fields of the optical fiber according to the present invention that has the refractive index profile shown in FIG. 4a and longitudinal acoustic delta profile shown in FIG. 4b.

FIG. 4a illustrates the optical delta profile of the core 12 of an exemplary laser fiber (Fiber A4 in Table 1, below). This laser fiber has an optical delta profile similar to that of FIG. 3a, but with a broader depression in the core region 12a. More specifically, the core region 12a has an optical delta of 0.35% and a radius of 6 μm. The longitudinal acoustic delta profile of the fiber 10 (corresponding to FIG. 4a) is very different from the one illustrated in FIG. 2a. The longitudinal acoustic delta profile of this laser fiber 10 is illustrated in FIG. 4b. In this example, the delta % in the central core region 12a is −0.72%. A different exemplary fiber 10 with 0% of central core delta corresponds to the Fiber A3 of Table 1. Because Ge decreases the acoustic velocity, with less Ge doping in the central core region 12a, the longitudinal acoustic delta profile is also highly depressed in the center. This has the effect of pushing both the optical field and acoustic field away from the center of the core 12. Therefore, the FOM is increased largely by the increase of the optical effective area from 385 μm² to 680 μm². The overlap integral, which describes the extent of the overlap between the fundamental optical mode and lower order acoustic modes is 0.88. The SBS threshold of fiber 10 (corresponding to FIGS. 4a–4b) is increased by a factor of 2.0 or 3 dB from the step index fiber without the wide depressed central core region 12a. From the study of the Fibers A2 and A3, which have been listed in Table 1, the higher SBS threshold is achieved by introducing a wider and deeper depressed region in the refractive index profile, which is located in the region 12a, adjacent to the center line. This depression in the refractive index profile of the core 12 may be achieved by using less or no Ge in the core region 12a, or by using both Ge and Fluorine to down-dop the core region 12a.

TABLE 1

| Profile ID | MFD (um) | Effective Area (um^2) | FOM (um2) | Power Through Fiber (P0) | Overlap Integral |
|---|---|---|---|---|---|
| A1 | 21.6 | 385.3 | 385.4 | 1 (0 dB) | 1.00 |
| A2 | 21.8 | 396.6 | 405.3 | 1.05 (0.22 dB) | 0.98 |
| A3 | 20.6 | 850.6 | 1044 | 2.71 (4.33 dB) | 0.81 |
| A4 | 22.2 | 680.2 | 774 | 2.01 (3.03 dB) | 0.88 |
| A5 | 23.2 | 483.4 | 661.8 | 1.71 (2.35 dB) | 0.73 |
| A6 | 23.9 | 516.1 | 927.5 | 2.4 (3.8 dB) | 0.56 |

One drawback of the above example is that the change (depression) of the central core delta may become too large so that the optical mode field is also altered significantly from that of the original step index fiber. In laser fiber application, it is preferred that the fundamental optical field keeps a Gaussian shape with a peak value of the optical field achieved in the center of the fiber core.

Figure 5A:
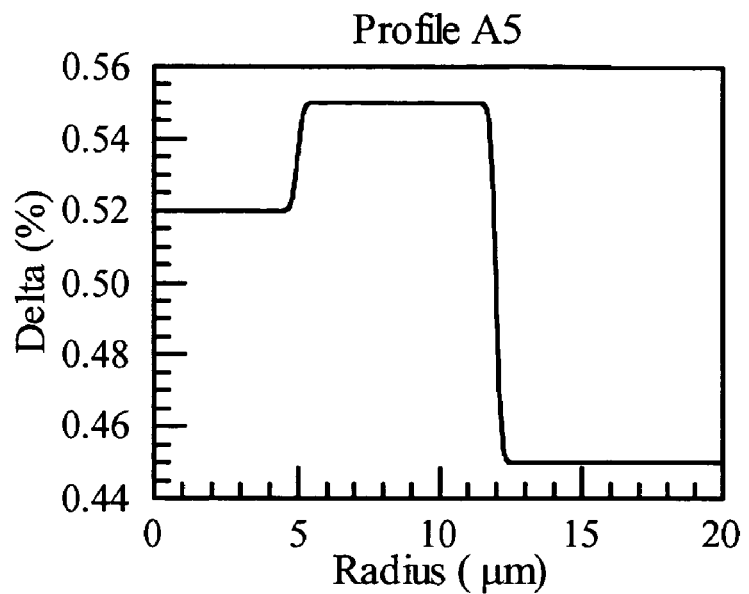
FIGS. 5a and 5b illustrate optical delta profiles of two embodiments of the optical fiber according to the present invention.
Figure 5B:
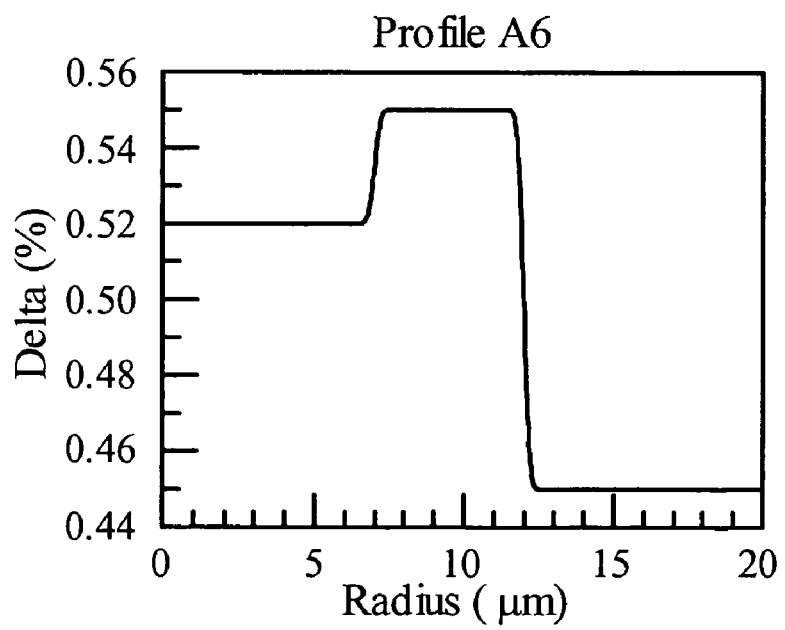
Figure 5C:
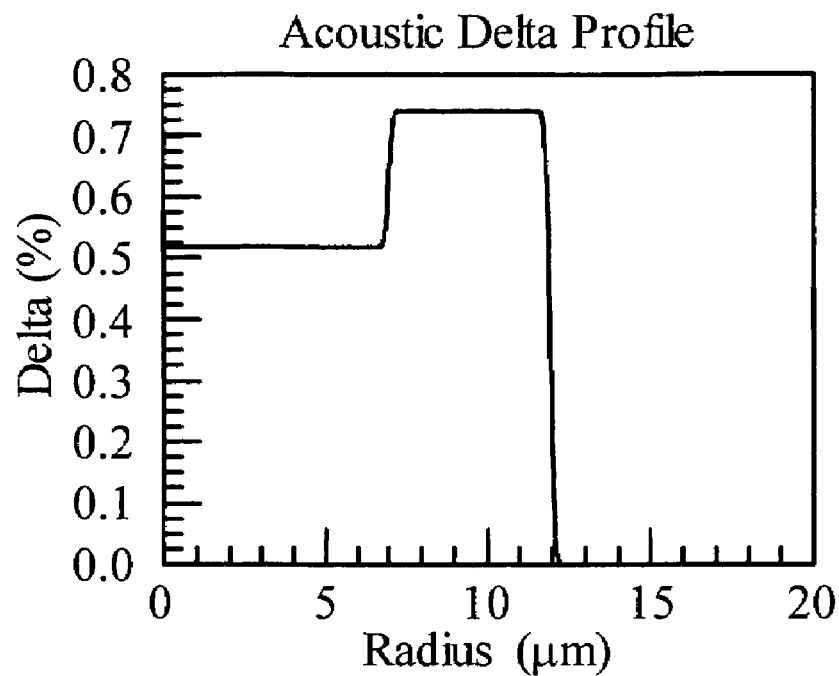
FIG. 5c illustrates the longitudinal acoustic delta profile of the optical fiber corresponding to FIG. 5b.
Figure 5D:
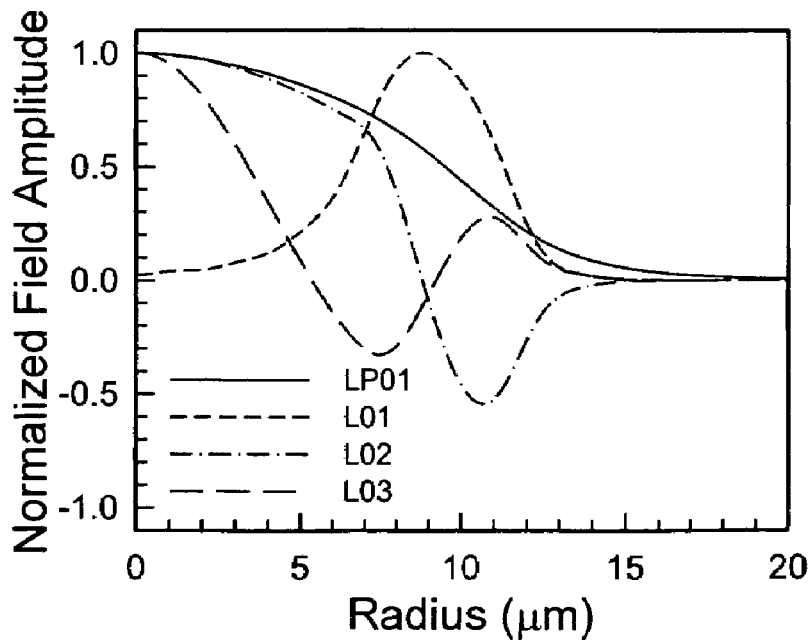
FIG. 5d is a plot of optical and longitudinal acoustic fields of the optical fiber that corresponds to the optical profile of FIG. 5b the acoustic delta profile of FIG. 5c.

We subsequently consider two examples (Fiber A5 and Fiber A6) where the depression of the central core delta is less dramatic for the optical field but is still sufficiently large to create desired changes in the longitudinal acoustic field. The optical delta profiles of these two fibers are shown in FIG. 5a and FIG. 5b respectively. For illustration, the acoustic delta profile of A6 is shown in FIG. 5c. For the optical fiber A6 of Table 1, the MFD at 1550 nm is 23.9 μm, the optical effective area is 516.1 m² at 1550 nm, and the FOM of the L01 acoustic field is 927.5 μm so that the overlap integral is 0.56. FIG. 5d illustrates the optical fields and acoustic fields of the several lowest orders of the exemplary fiber A6 of Table 1. We have found (FIG. 5d) that the optical field LP01 remains to be a quasi-Gaussian while the acoustic fields have been pushed away from the center of the core 12, therefore, reducing the overlapping between the optical field and the acoustic field. The higher order acoustic fields are oscillating in nature. The overlap of such fields with the optical field (e.g., $LP_{01}$) is very small, because their positive contribution is largely cancelled by their negative contribution. The reason that we can maintain the quasi-Gaussian shape of the optical field is due to the significant difference between the optical delta profile and acoustic delta profile. The 1% change of optical delta corresponds to the 7% of acoustic delta. A small change of optical delta can have much larger effect in acoustic delta. In addition, by comparing optical fiber 10 examples (A5 and A6), we find that the SBS performance can be optimized by adjusting the depth and the width of the depressed central core delta region.

EXAMPLE 2

Pushing the Acoustic Field Away from the Center

The following exemplary optical fibers 10 that have an optical refractive index profile with three core regions 12a, 12b and 12c, and the optical refractive index profile is depressed in the center region 12b of the fiber core 12.

Figure 6A:
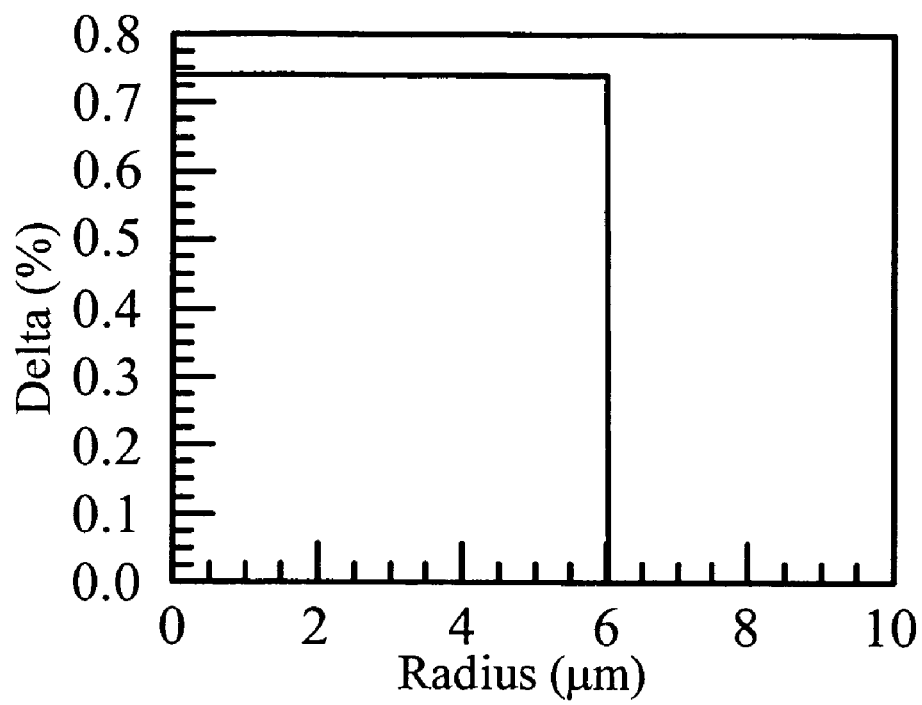
FIG. 6a illustrates an optical delta profile of an optical fiber used for comparative purpose.
Figure 6B:
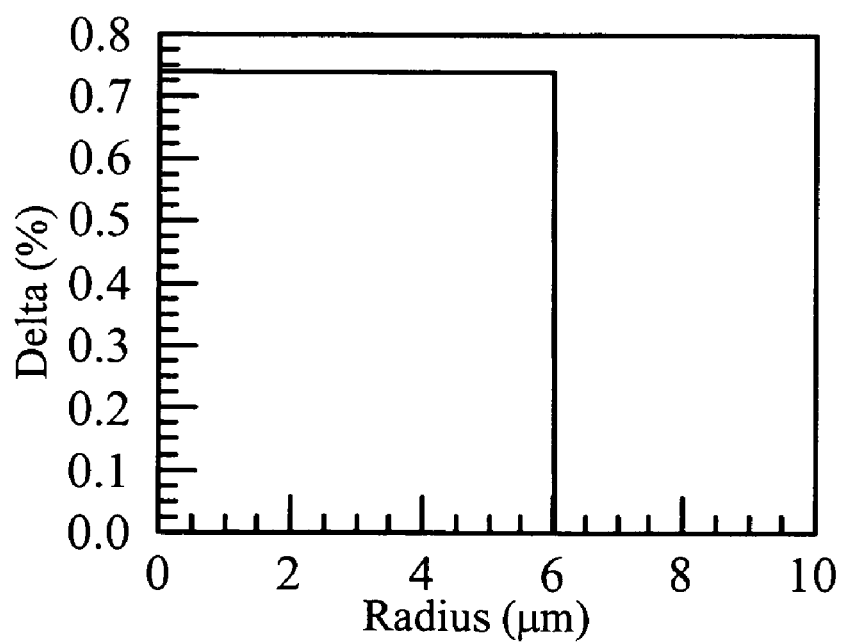
Figure 6C:
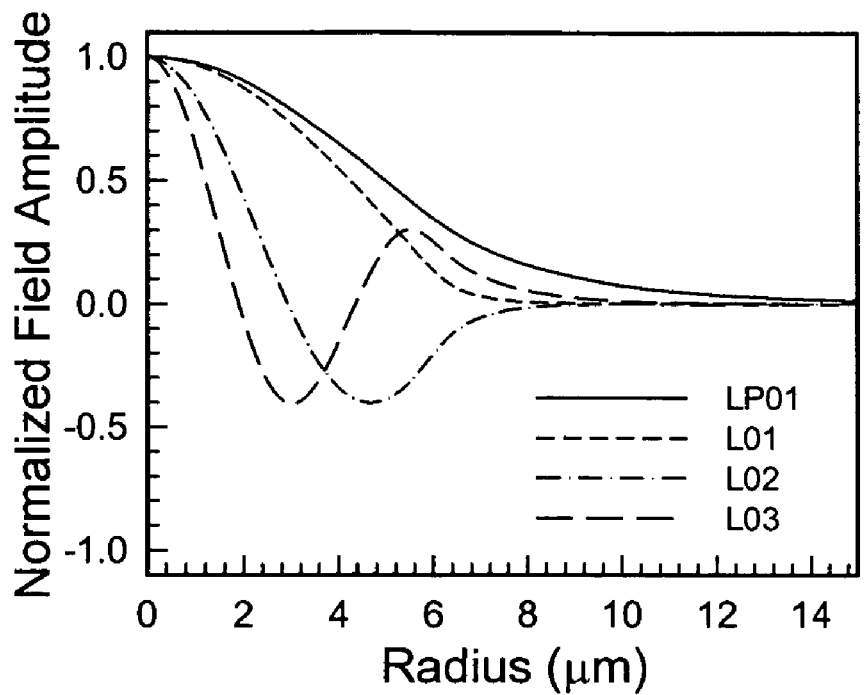
FIG. 6c is a plot of optical and longitudinal acoustic fields of the optical fiber that corresponds to the profiles of FIGS. 5a and 5b.

First, we want to establish a reference for measuring the SBS improvement. We consider a Ge doped laser fiber with an optical delta profile shown in FIG. 6a. The corresponding acoustic delta profile of this fiber is shown in FIG. 6b. It is noted that the acoustic waveguide area is deeper because each percent of change in refractive index due to Ge doping induces 7.2% of delta change in effective acoustic delta profile. In addition, the acoustic wavelength for the longitudinal acoustic wave is about ⅓ of that of optical wavelength, so that the multimode feature of the acoustic waveguide is further enhanced. The optical effective area of this optical fiber 10 is 271.2 µm$^2$, MFD is 19.1 µm, and the figure of merit FOM is 296.9 µm. The optical field and the acoustic fields are shown in FIG. 6c. FIG. 6c shows an almost complete overlap between the optical and acoustic fields LP01 and L01.

Figure 7A:
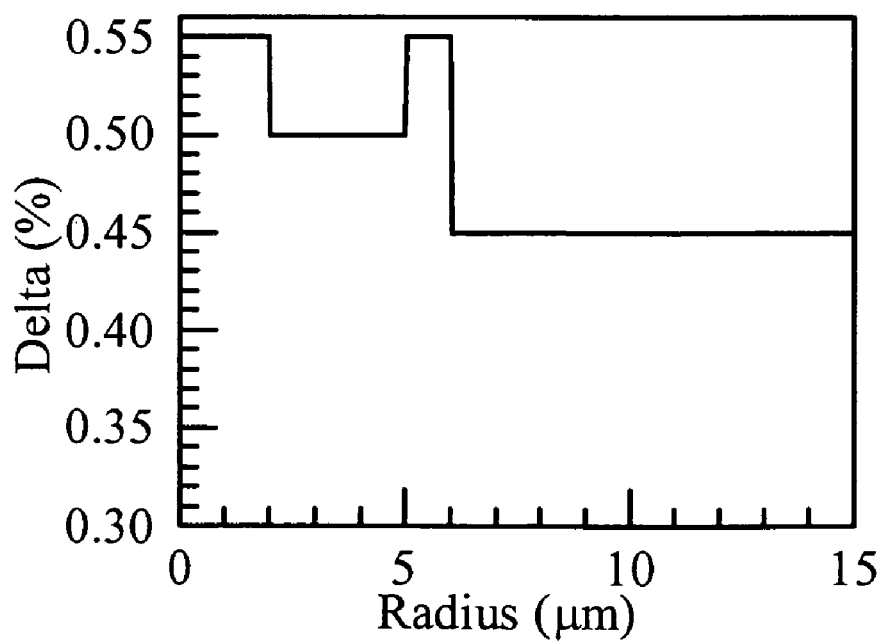
FIG. 7a illustrate an optical delta profile of another embodiment of the optical fiber according to the present invention.
Figure 7B:
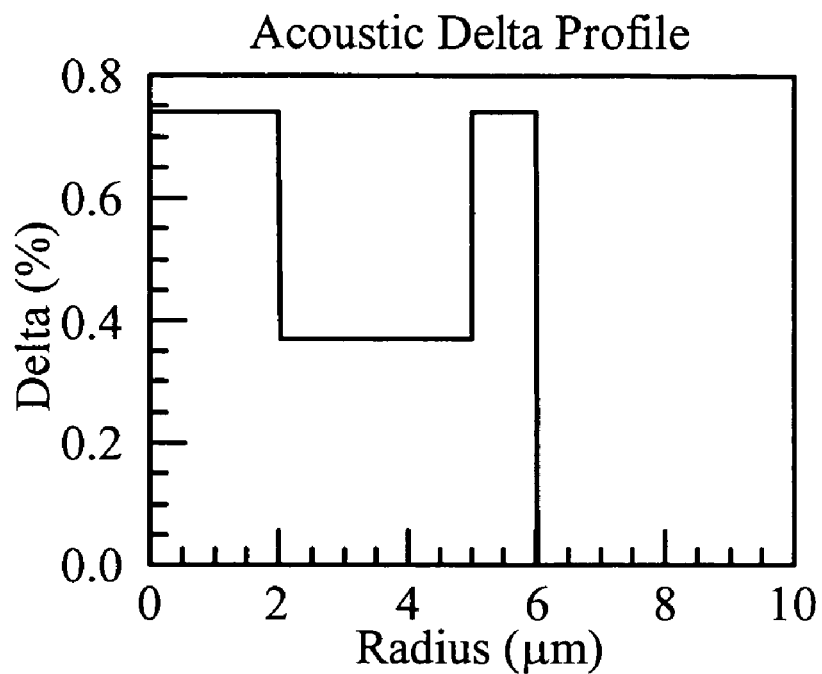
Figure 7C:
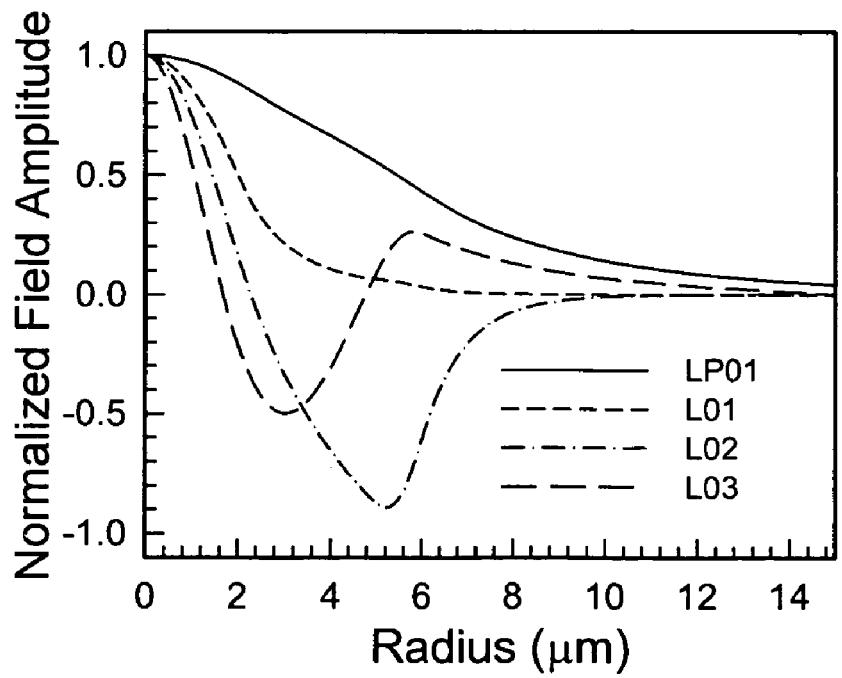
FIG. 7c is a plot of optical and longitudinal acoustic fields of the optical fiber that corresponds to the profiles of FIGS. 7a and 7b.

In the following exemplary fibers 10 the SBS threshold improvement is accomplished by pushing the acoustic field away from the center of the fiber core 12 so that the overlap between the optical field LP01 and fundamental mode acoustic field is reduced. As shown in FIG. 7a, we introduce a fiber with a depressed region (or dip) in the refractive index profile, corresponding to the core region 12b. In this example, the radius of this region is between 2–5 µm. The effective acoustic delta of this optical fiber 10 is shown in FIG. 7b. It is clear from this figure that the dip in the core's refractive index profile of the laser fiber 10 has a much larger effects in the longitudinal acoustic waveguide than that in the optical delta profile. The optical fields and acoustic fields of the optical fiber of FIG. 7a are shown in FIG. 7c. FIG. 7c illustrates that the acoustic mode L01 is confined to a narrow region of the core 12 (around the center line), minimizing the overlap area between the optical mode LP01 and acoustic mode L01. More specifically, the fiber core region 12a (with outer radius r of 1–3 µm) is sufficient to form an acoustic waveguide to confine acoustic modes (inside it). On the other hand, the refractive index dip within the core 12 has only a minor effect to the optical field. The effective area of this laser fiber is 468.6 µm$^2$, MFD is 25.1 µm, and the figure of merit is 917.2 µm$^2$. Relative to the reference fiber shown in FIG. 6a, the SBS threshold is improved by a factor of 3.09 or 4.9 dB.

Figure 8A:
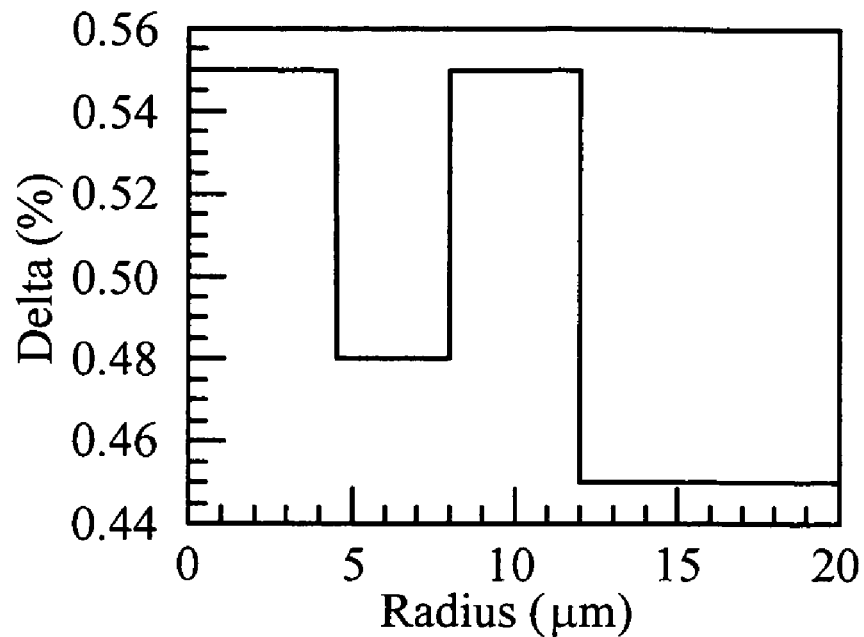
FIG. 8a illustrate an optical delta profile of yet another embodiment of the optical fiber according to the present invention.
Figure 8B:
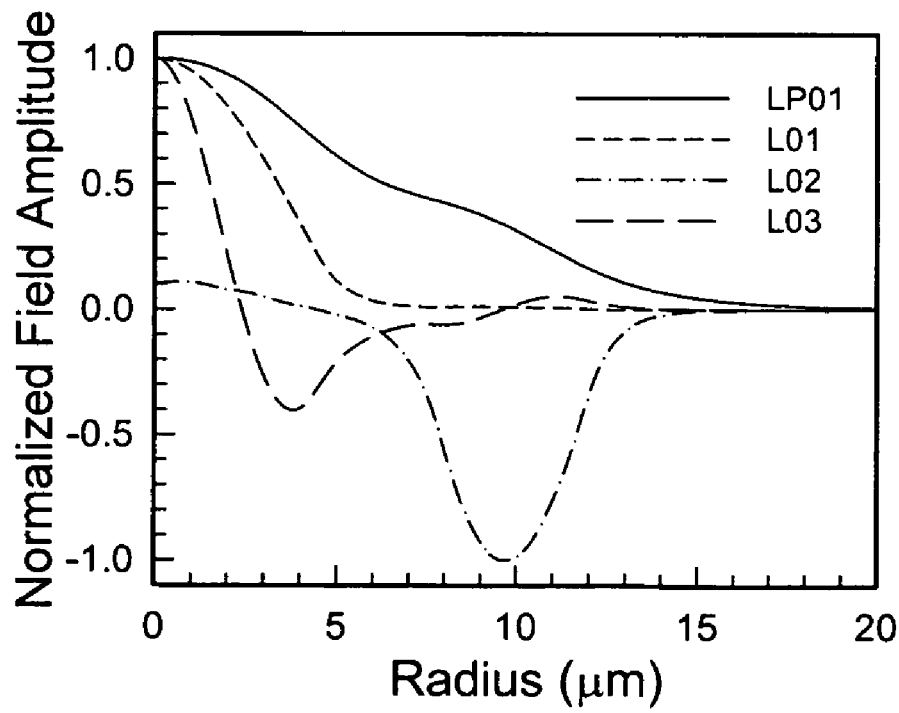

Another exemplary laser fiber 10 has a much larger core radius of 12 µm. The improvement in SBS performance is measured against a more conventional design based on simple step index structure, which is similar to FIG. 6a except that the radius is 12 microns. The effective area of this reference fiber is 415 µm$^2$, MFD is 22.3 µm, and the FOM is 414.5 µm$^2$ at 1550 nm. We then introduce a depression in the refractive index delta % in the center region of the fiber core (region 12b), which in this example corresponds to radius 4.5 and 8.0 µm m and has the depth of 0.07% in delta. The optical refractive index profile of this fiber is shown in FIG. 8a. The effective area of this fiber is 512.3 µm$^2$, MFD is 24.4 µm, and the figure of merit F is 1051.9 µm$^2$. Relative to the step index fiber with 12 microns radius, the SBS threshold is improved by a factor of 2.54 or 4.04 dB. The LP01 optical field and the L01, L02, L03 longitudinal acoustic fields are shown in FIG. 8b. FIG. 8b illustrates that the acoustic mode L01 is confined to a narrow region of the core 12 (around the center line), minimizing the overlap area between the optical mode LP01 and acoustic mode L01. This example shows that for fibers with larger core radius, the depressed core region 12b can also be designed to bring the improvement of SBS performance.

Preferably, the longitudinal acoustic field velocities between the first two adjacent core regions from the center as shown in the above differ by at least 0.2%. Optical laser fibers 10 have a reduce overlap integral of less than 0.8 at 1550 nm. Preferably, the overlap integral is less than 0.65. More preferably, the overlap integral is less than 0.5.

In the above examples, we have chosen multiple step profile to illustrate the preferred embodiments. In an actual process, the transition between different core regions can be smoother. For a skilled person in the art, it is straightforward to make some adjustments to accommodate the practical situations.

Preferably, the optical fiber disclosed herein has a silica-based core and cladding. In preferred embodiments, the cladding has an outer diameter of about 125 µm or more, preferably 200–2000 µm for laser applications. Preferably, the outer diameter of the cladding has a constant diameter along the length of the optical fiber. Cladding 14 may include an inner cladding 14a and an outer cladding 14b. It is preferable that the inner cladding 14a has a non-circular cross-section in order to provide better pumping of the core 12.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
a rare earth doped core having a refractive index profile and a centerline, the core including at least two adjacent core regions including different amounts of updopants, such that the longitudinal acoustic velocities within the two core regions differ by at least 0.2%;
and a cladding layer surrounding and directly adjacent the core, said fiber having (a) MFD of greater than 12 µm and (b) delta % difference between the peak core delta and the cladding of less than 0.3%.

2. The optical fiber according to claim 1, wherein the longitudinal acoustic field velocities within the two core regions differ by at least 0.3%.

3. The optical fiber according to claim 1, wherein the optical delta profile of said core has a dip directly surrounding the centerline and said dip has a radius or width that is wider than 0.7 µm.

4. The optical fiber according to claim 3, wherein said dip has a radius or width that is at least 1.0 µm.

5. The optical fiber according to claim 3, wherein said dip has a radius or width that is at least 2 µm.

6. The optical fiber according to claim 1, wherein said fiber has an MFD of greater than 15 µm.

7. The optical fiber according to claim 1, wherein said fiber has an MFD of 25 µm to 50 µm.

8. The optical fiber according to claim 1, wherein the delta % difference between the peak core delta and the cladding is less than 0.2%.

9. The optical fiber according to claim 1, wherein the delta % difference between the peak core delta and the cladding is less than 0.12%.

10. The optical fiber according to claim 1, wherein said overlap integral is less than 0.65.

11. The optical fiber according to claim 1, wherein said overlap integral is less than 0.5.

12. The optical fiber according to claim 1 wherein said first region has a radius of no more than 2 μm and said second region has a radius of more than 2 μm.

13. The optical fiber according to claim 1 wherein said first region has an outer radius of no more than ⅓ of the fiber core radius and said second region has an outer radius greater than ⅓ more of the fiber core radius.

14. The optical fiber according to claim 1 wherein aid cladding layer includes a silica based inner cladding layer and a silica based outer cladding layer.

15. An optical fiber comprising:
a Ge doped core having a refractive index profile and a centerline, the core comprising a first region having an acoustic $\Delta_1$ and a second region directly adjacent the first region and having an acoustic $\Delta_2$ wherein $\Delta_1$ does not equal to $\Delta_2$, said two regions having a different average refractive index and the width or radius of the region with a lower refractive index is at list 1 μm
wherein the optical fiber has an attenuation at 1550 nm;
wherein the refractive index of the core is selected to provide an overlap integral less than 0.8 at 1550 nm.

* * * * *